(12) United States Patent
Doppler (10) Patent No.: US 8,602,395 B2
(45) Date of Patent: Dec. 10, 2013

(54) DEVICE FOR INSERTING GAS BUBBLES INTO A LIQUID

(75) Inventor: Roland Doppler, Baden (AT)

(73) Assignee: Aquaconsult Anlagenbau GmbH, Baden (AT)

( * ) Notice: Subject to any disclaimer, the term of this patent is extended or adjusted under 35 U.S.C. 154(b) by 390 days.

(21) Appl. No.: 12/989,683

(22) PCT Filed: Apr. 30, 2009

(86) PCT No.: PCT/AT2009/000180
§ 371 (c)(1),
(2), (4) Date: Oct. 26, 2010

(87) PCT Pub. No.: WO2009/132374
PCT Pub. Date: Nov. 5, 2009

(65) Prior Publication Data
US 2011/0057334 A1    Mar. 10, 2011

(30) Foreign Application Priority Data
May 2, 2008   (AT) .................. A 694/2008

(51) Int. Cl.
*B01F 3/04*   (2006.01)
(52) U.S. Cl.
USPC ........................ 261/64.1; 261/122.2
(58) Field of Classification Search
USPC ............... 261/64.1, 122.1, 122.2, DIG. 70
See application file for complete search history.

(56) References Cited

U.S. PATENT DOCUMENTS

| | | | | |
|---|---|---|---|---|
| 1,792,286 | A * | 2/1931 | Curry et al. | 261/122.2 |
| 4,288,394 | A * | 9/1981 | Ewing et al. | 261/122.1 |
| 4,870,992 | A | 10/1989 | Irwin et al. | |
| 5,378,355 | A * | 1/1995 | Winkler | 210/136 |
| 5,858,283 | A * | 1/1999 | Burris | 261/122.1 |
| 5,863,031 | A | 1/1999 | Veeder et al. | |
| 6,367,783 | B1 * | 4/2002 | Raftis | 261/122.1 |
| 6,390,456 | B1 * | 5/2002 | Lee et al. | 261/120 |
| 6,406,005 | B1 * | 6/2002 | Lawson et al. | 261/122.1 |
| 2002/0167095 | A1 * | 11/2002 | Tseng | 261/122.1 |
| 2004/0124550 | A1 * | 7/2004 | Casper et al. | 261/122.1 |
| 2004/0144435 | A1 | 7/2004 | Dark | |
| 2007/0013089 | A1 | 1/2007 | Sasajima | |
| 2008/0251954 | A1 * | 10/2008 | Casper et al. | 261/122.1 |

FOREIGN PATENT DOCUMENTS

| | | |
|---|---|---|
| AT | 412 760 B | 7/2005 |
| DE | 36 00 234 A1 | 7/1987 |
| DE | 38 09 016 A1 | 9/1989 |
| DE | 90 13 213 U1 | 11/1990 |
| DE | 39 21 937 A1 | 1/1991 |
| DE | 94 12 161 U1 | 3/1995 |

(Continued)

OTHER PUBLICATIONS

English translation of EP 0 549 518 A1 published Jun. 30, 1993.

(Continued)

*Primary Examiner* — Charles Bushey
(74) *Attorney, Agent, or Firm* — Ladas & Parry LLP (57) ABSTRACT

The invention relates to a device (1) for inserting gas bubbles into a liquid, the device including a base plate (2) with a gas supply opening (3) which is connected to a gas supply device (3) and closable by a valve, wherein a valve element (12) is fixed in the operating position directly to the upper side of the base plate (2).

17 Claims, 7 Drawing Sheets

(56) References Cited

FOREIGN PATENT DOCUMENTS

| | | |
|---|---|---|
| DE | 200 07 347 U1 | 7/2000 |
| DE | 102 51 494 A1 | 7/2003 |
| EP | 0 229 386 A1 | 7/1987 |
| EP | 0 549 518 A1 | 6/1993 |
| EP | 0 919 524 A1 | 6/1999 |
| GB | 1 304 147 A | 1/1973 |
| GB | 2 319 189 A | 5/1998 |
| JP | 50-83612 | 7/1975 |
| JP | 50-86735 | 7/1975 |
| JP | 58-19798 U | 2/1983 |
| JP | 58-20296 A | 2/1983 |
| JP | 61-51999 U | 4/1986 |
| JP | 3-22598 Y2 | 5/1991 |
| JP | 03 165897 A | 7/1991 |
| JP | 2001-334288 A | 12/2001 |
| JP | 2003-164743 A | 6/2003 |
| JP | 2007-105612 A | 4/2007 |
| JP | 2008-500153 A | 12/2008 |
| LU | 40 629 A1 | 11/1961 |
| WO | WO 2004/014532 A1 | 2/2004 |
| WO | WO 2005/115929 A1 | 12/2005 |

OTHER PUBLICATIONS

English translation of DE 94 12 161 U1 published Mar. 23, 1995.
English translation of DE 36 00 234 A1 published Jul. 9, 1987.
English-language version of an International-type Search Report dated Nov. 9, 2010 in respect of counterpart PCT Application No. AT2009/000180.
Examination Report dated Mar. 19, 2013 for Application No. JP 2011-506532.
espacenet English abstract of JP 2008-500153 A, May 2013.
espacenet English abstract of JP 2001-334288 A, May 2013.
espacenet English abstract of JP 2003-164743 A, May 2013.
espacenet English abstract of JP 2007-105612 A, May 2013.

* cited by examiner

DEVICE FOR INSERTING GAS BUBBLES INTO A LIQUID

The invention relates to a device for introducing gas bubbles into a liquid, comprising a base plate with a gas supply vent formed therein, which is connected to a gas supply device and is closable in a valve-like manner.

In the case of the biological purification of waste water by using aerobic processes in clarifying tanks, devices for introducing air bubbles are used and are positioned on the floor of the tank. These devices are also referred to as 'aerators'. In most cases, they feature a plate-shaped base member with either a perforated, slotted or other gas permeable plate, film or membrane attached thereto, in general an expandable or else rigid gas bubble emission member. Between the base member and the gas bubble emission member, in the case of a perforated membrane, a more extendable gap is provided for, into which gas, preferably air, is supplied and is delivered in the form of fine bubbles through the perforations under appropriate pressure to the waste water which is to be cleaned.

A plate-shaped aerator of this type for fine bubble aeration of water is known, for example, from EP 0 028 728 A1. An upper perforated air distributor film is affixed by means of clamping profiles, and supported by webs, to a tight base plate with an air supply vent connected to an air supply line. The air distributor film is sealed in place in situ directly opposite the air supply vent by a sealing ring, so that when the air supply is switched off and when the upper air distributor film rests on the base plate, the sealing ring rests against the air supply vent. A type of valve is thus created which prevents the entry of water and dirt particles contained therein into the air supply line through the air supply vent. The disadvantage of this aerator is that the gas connection or the gas supply vent is, in principle, exposed and is therefore not protected in the case of waste water running back. In the event of damage, the gas supply device is therefore not protected against waste water running back. If there is a tear in the air distributor film, this and the sealing ring abut on the surface of the base plate and on the air supply vent formed therein, however it can easily become detached therefrom and move away if at all the sealing ring comes to rest directly on the air supply vent and covers it completely due to the constant strain on the air distributor film due to its material properties. Particles suspended in the waste water then become attached to the gas supply vent and occlude or clog it. Such an incident may also cause greater damage, which results not only in complex repair works to the whole aerator with associated costs and standstill of the plant operation, but also, in extreme cases, in the replacement of the aerator with a new one.

A surface aerator for gassing liquids with fine bubbles is known from DE 33 16 140 A1, in which, inter alia, a gas distributor member made of a rigid, porous material is connected to a flexible base member. In order to seal the air supply vent during an interruption to the air supply against the liquid, the rigid gas distributor or gas bubble emission member features, on the underside, a resilient sealing member opposite the air supply vent, which sealing member abuts on the edge of the air supply vent in an unpressurised state. Since the gas distributor member of this surface aerator cannot naturally bulge due to its rigid material, and therefore the surface of the gas distributor member cannot expand, when air is blown into the gap between the gas distributor member and the base member, it is only possible for air and pressure to be distributed in the gap when the base member bulges, although there are limitations to this and a discharge of air into the waste water, and thereby the cleaning of the waste water, is only possible in a reduced manner. Furthermore, due to the rigid material of the gas distributor member, maintenance and repair works or even replacement of the gas distributor member are relatively difficult to carry out.

The object of the invention is therefore to provide an aeration device of the type mentioned at the outset, which guarantees a reliable and efficient gas supply, and at the same time ensures optimal gas distribution as well as gas introduction into the waste water, thus reliably avoiding any hindrance to the release of gas. Furthermore the device should be of simple construction, easily repairable and cost-effective.

This object is achieved in accordance with the invention by an aeration device with a gas supply device for introducing gas bubbles into a liquid a base plate and a membrane detachably retained on one side thereof, the base plate having formed therein (2) and a gas supply vent (3), the gas supply vent comprising a valve member (12) made of resilient material, the gas supply vent being connected to the gas supply device as further described in detail herein. Advantageous embodiments and developments are also described Through the attachment of a valve member directly to the upper side of the base plate in the operation position, not only is the emission of gas from the gas supply vent continuous and without disruption, but the pressure distribution of the gas, such as air, can also be optimised at the same time. In this way the valve member embodies, in principle, a form of one-way valve, preferably made of resilient material, for example comprising at least one incision or slot, and with the aid of this one-way valve the gas supply vent can be reliably closed, for whatever reason, when the gas supply is interrupted. Even in the event of a tear in a perforated membrane, preferably used as a gas distributor, or of other comparable disfunctions of the aerator, the gas supply vent can be protected against waste water and the particles suspended therein flowing back, since the valve member is directly affixed to the base member. In addition, the gas flowing from the gas supply vent can be optimally controlled with the aid of such a valve member on the base plate. Furthermore, a valve member of this type is easy to produce and to attach, and, where applicable, easily allows for the correction of disturbances.

Depending on the application and objective, the valve member can comprise differently shaped slots, with an arc-shape being advantageous for fluidic reasons if high flow rates are desired, this being the case especially if the valve member is circular or substantially round, in correspondence with a circular shape of the gas supply vent. In this instance it is also advantageous if, with use of an elongate base plate, the gas supply vent with the valve member attached directly thereto is arranged close to the shorter side or end face of said elongate base plate and the concave side of the arc-shaped slot is oriented towards the opposite end face of the base plate. In this way the valve member can be opened in a flap-like manner during gas supply in such a way that an optimal and uniform pressure, and therefore gas distribution can be set over the whole length of the aerator and an equal gas pressure over the whole surface of the resiliently deformable, perforated membrane can be achieved in a simple manner, allowing the gas to be delivered to the waste water with homogeneous distribution.

Through the choice of the slit in the valve member, a characteristic curve of pressure loss with an exponent of up to less than 1 can be achieved, which has advantageous effects on the adjustment range of the gas distribution. In addition to this, the slotted valve member made of resilient material is advantageous when setting or interrupting the gas supply. In this case the remaining gas gradually escapes from the aerator via the perforated membrane before the valve member is closed completely. Due to the lowering gas pressure, the membrane can gradually slacken, and an excessive pressure rise at the membrane from outside (waste water) can be prevented. This load relief effect of the membrane also causes the perforations in the membrane to narrow and the dirt particles are thus pressed out from the perforations.

It is favourable for manufacture if the resilient material of the valve member corresponds to that of the membrane.

In principle, the valve member can also be used or retrofitted in conventional aerator devices. For optimal exploitation of the effects and advantages of the valve member, it is favourable to use the valve member in an aerator which comprises a rigid, substantially rectangular, in plan view, base plate as a base member, and a resilient perforated membrane attached to the upper face thereof.

A simply formed and easily "manageable" aerator device is provided if the device is provided in a modular manner. It can therefore be produced, transported and assembled without too much effort and cost. The individual constructional parts are, as far as possible, detachably connected to each other so that they can also be easily separated. As a result, the individual aerator parts, such as the valve member, membrane, base plate, end parts, gas supply device, etc. are made so as to be easily accessible, and repair, replacement, cleaning or maintenance work can be carried out at individual parts of the aerator without too much effort and cost.

The respective connections between the individual construction parts can either be selected in the form of non-positive and/or positive connections, or else in the form of material connections.

For example, it is preferable for the membrane to be detachably fastened to the longitudinal sides and end faces of the base plate. The membrane can be clamped to the longitudinal sides of the base plate in grooves with a correspondingly formed locking member. Such a method of attachment can also be provided at the end faces of the base plate. The membrane is preferably retained there by means of end parts that are also detachably mounted to the base plate.

The detachable connection between the end parts to the base plate may be a simple plug-in connection, and for the attachment of the membrane to the end faces of the base plate the end parts may comprise a clamping groove, in which the base plate fits snugly with the membrane. The membrane can thus be 'turned' over the end faces of the base plate, and can be clamped in place by the snug fit in the clamping groove of the end parts.

In addition to the positive and non-positive connections, if desired for safety reasons, the construction parts can also be stuck together. In some cases, this is particularly desired when connecting the membrane to the base plate, as the resilient membrane is severely tensioned with higher gas pressures at the connections to the base plate, that is to say, at its edges. In order to prevent the membrane from being pulled out and a corresponding failure of the aerator, and to strengthen the connection points, simple adhesive strips in the form of strong double sided adhesive tape, for example, can be provided or a suitable adhesive—toric—can be applied at the desired points. With regard to the previous variant, polyurethane adhesives have proved their worth as a membrane material, above all in conjunction with a condensation polymer or an addition polymer product, such as polyurethane, EPDM, silicone, Viton, polyethylene trifluoride or polycarbonate. In the same way, this material pairing is also suitable for the adhesive attachment of the valve member to the base plate. It has been found that such an adhesive connection also facilitates a simple and swiftly feasible assembly of the aerator device, in particular the attachment of the valve member and the membrane.

The valve member can nevertheless be detachably attached likewise to the base plate, for example a detachable adhesive or adhesive strip possibly being provided in the fastening region at the edge of the gas supply vent or the valve member.

The end parts can also be connected to the base plate via an additional adhesive connection, for this purpose a polyurethane adhesive which is inserted into the corresponding holes in the end parts being favourable. With regard to manufacture and adhesion of the end parts to the base plate, it is favourable to provide the end parts as plastics material injection-moulded parts.

As a gas supply device, an established gas supply device can, in principle, be used which can supply gas under appropriate pressure to the space between the base plate and the perforated membrane. In this regard it is also advantageous when carrying out work on the aerator or on parts of it, if the gas supply device is detachably connected to the base plate.

The invention will be described in greater detail below with reference to the embodiments illustrated in the drawings, in which.

Figure 13:
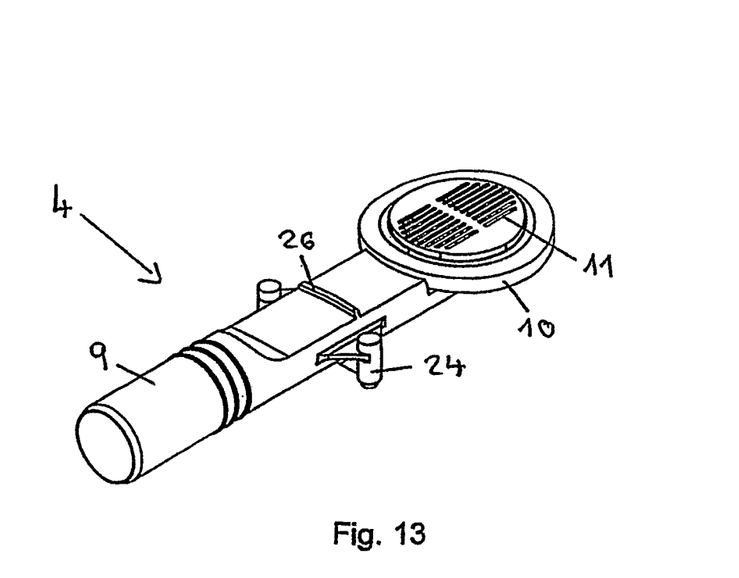
FIG. 13 is a perspective view of a gas supply device with gas supply channel and base plate connection part in an aerator device with valve member.

FIGS. 1 to 6 show different schematic views of an aerator device 1 for introducing gas bubbles into a liquid. The device 1 comprises a rigid base plate 2 made of plastics material, and a gas supply vent 3 formed therein, which is connected to a gas supply device 4 (cf. FIG. 13) and is closable in a flap-like manner directly at the gas supply vent 3, as will be explained in more detail below.

The device 1 or the base plate 2 is, in plan view, substantially elongate or rectangular, a resilient, perforated membrane 5 (for example FIG. 2) made of a polymer material and used as a gas distributor being detachably retained at the longitudinal sides 6 and at the end faces 7 of the base plate 2. In each case an end part 8 is detachably connected to base plate 2 at the end faces 7 of the base plate 2, as is shown in more detail in FIGS. 10 to 12.

The gas supply device 4 (see particularly FIGS. 6, 7 and 13) is arranged at an end face on the underside of the base plate 2 and comprises a tubular gas supply channel 9 leading out via one of the end faces 7 of the base plate 2. The tubular gas supply channel 9 opens into a base plate connection part 10, which is plate-shaped and comprises a stepped edge so that it can be detachably retained with a snug fit in the gas supply vent 3 of the base plate 2 (see FIGS. 6 and 7). At the upper face the base plate connection part 10 has a grid structure 11 for optimised discharge of gases as well as support for a valve member 12 (see FIGS. 4 and 5).

The valve-like closability of the gas supply vent 3 is obtained by this valve member 12 made of resilient material and fastened directly to the upper face of the base plate 2. For this purpose, the valve member 12 is configured with an annular fastening region which extends beyond the edge of the gas supply vent 3 and with which it is attached to the base plate 2. In this way the valve member 12 can be simply stuck to the base plate 2 by means of an adhesive applied to the fastening region, for example a polyurethane adhesive. However, it is preferable to use a correspondingly strongly, adhesive, double-sided adhesive tape for tightness of the valve member 12, as this facilitates the attachment of the valve member 12 to the base plate 2, as well as its removal.

Figure 4:
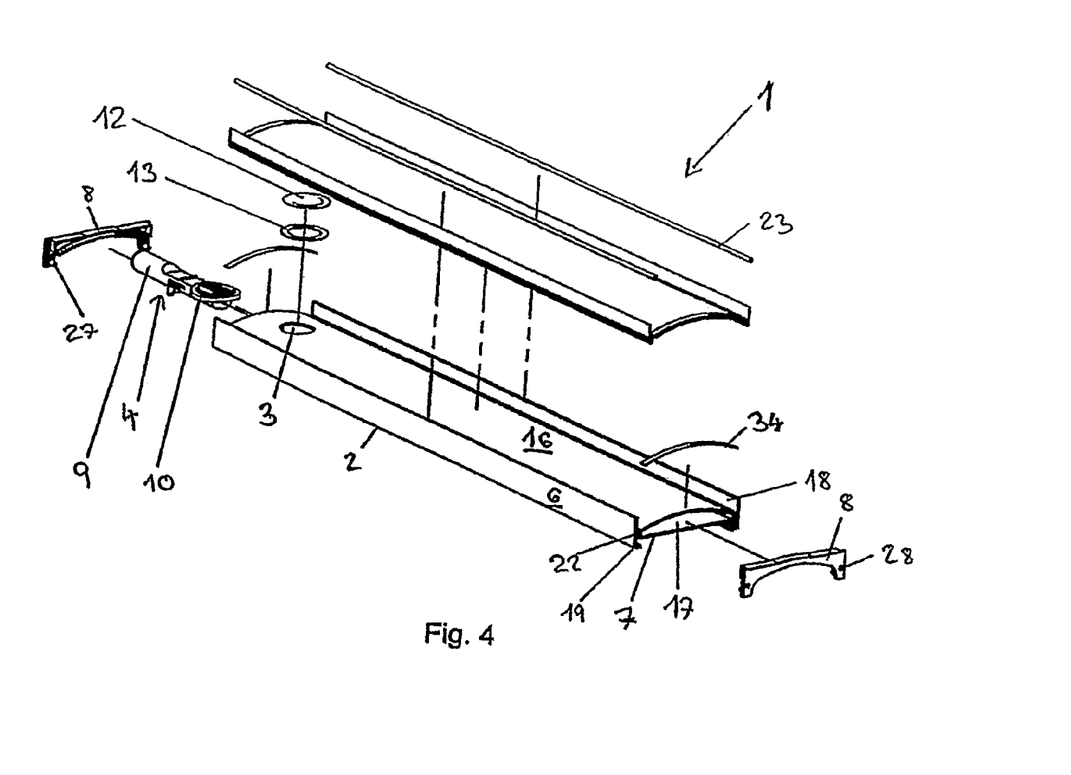
FIG. 4 is an exploded view of the aerator device according to FIG. 1.
Figure 5:
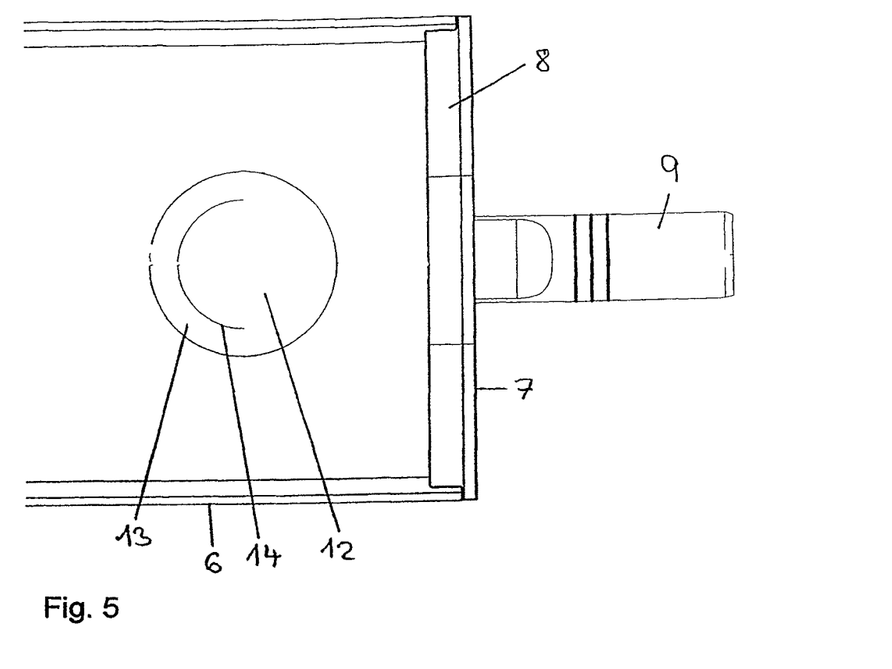
FIG. 5 a detailed view of FIG. 1 illustrating the gas supply vent with the valve member.
Figure 8A:
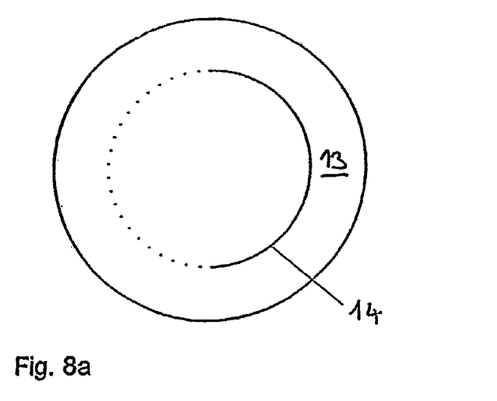
FIGS. 8a-8e are plan views of different embodiments of the valve member.
Figure 8B:
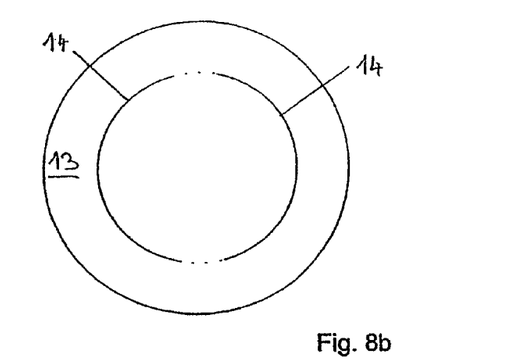
Figure 8C:
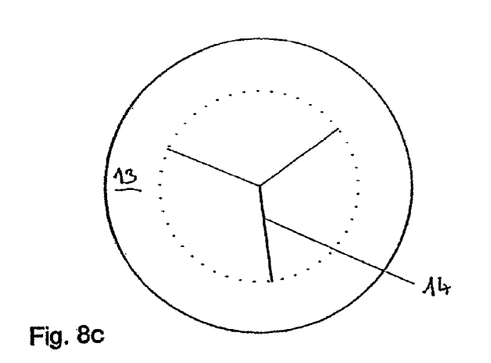
Figure 8D:
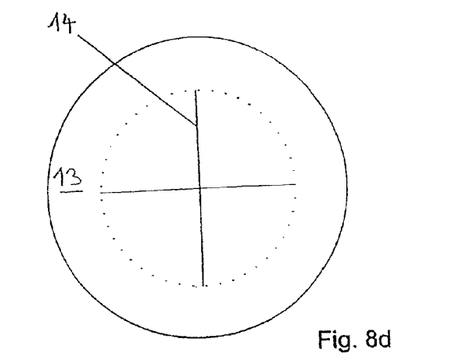
Figure 8E:
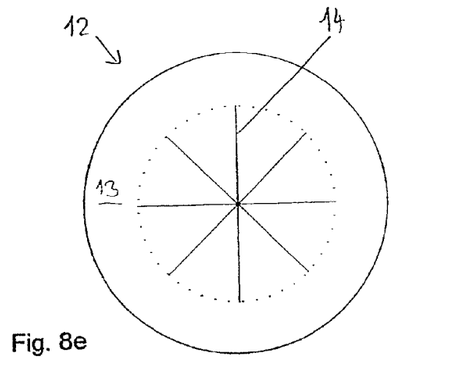

The valve member 12 comprises at least one slot 14, which is arc-shaped in the illustrations shown in FIGS. 4, 5 and 8a. Alternatively, other slot shapes can be provided and are shown schematically in FIGS. 8b to 8e by way of example, namely for instance double arc-shaped (FIG. 8b), star-shaped (FIG. 8e), Y-shaped (FIG. 8c) or cross-shaped (FIG. 8d). It is also possible, of course, to choose other slot shapes other than those shown, such as V-shaped etc. It has been found that the arc shape is particularly well-suited with regard to the behaviour of the valve member 12 concerning gas flow, flow regulation, and sealing of the gas supply vent. In detail, the arc-shaped resilient valve member 12 is opened in the operating position of the device 1 by the gas flowing from the gas supply vent 3 (see arrow G), in such a way that it bulges uniformly in the direction of flow owing to its substantially round shape and lets gas flow out in a defined manner. In this way a uniform flow and a uniform pressure can be set in the gap 15 between the base plate 2 and the membrane 5, which improves the gassing or aeration of the waste water through the membrane 5 and makes it more effective.

An arc-shaped valve member 12 is also advantageous if the gas supply is interrupted, since it has a simple flap action, the resilience of the valve member 12, optionally in conjunction with a corresponding vacuum in the gas supply vent 3, allowing the valve member 12 to tightly abut on the gas supply vent 3, therefore closing the latter in a protective manner. Even if the membrane 5 is torn, the gas supply vent 3 is covered reliably and tightly.

Figure 9:
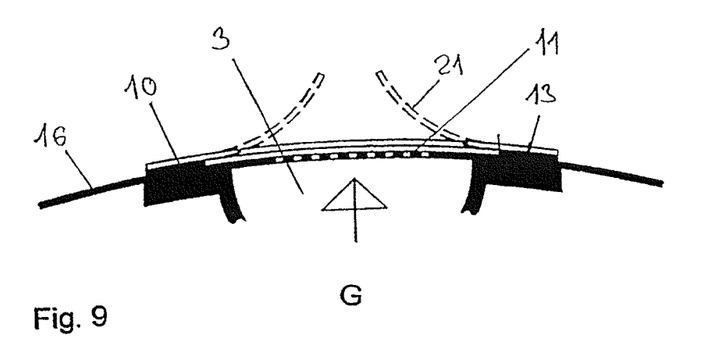
FIG. 9 is a sectional view of an alternative valve member to FIG. 7 at a gas supply vent in the open position.

Since the valve member 12, as mentioned, can also have a "flow-directing" action on the gas, different slot shapes in the valve member 12 can be provided depending on the choice of arrangement of the gas supply vent 3 or the valve member 12 at the base plate 2 (see FIGS. 8a to 8e). The open position of a valve member 12, for example with a central or cross-shaped slot, during gas supply is shown in the schematic sectional view in FIG. 9.

Figure 2:
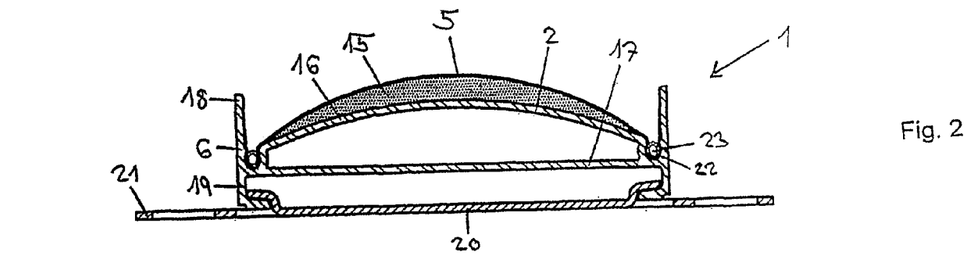
FIG. 2 is a sectional view of such an aerator device comprising an aerator base plate and membrane attached to it, in the operating position.
Figure 3:
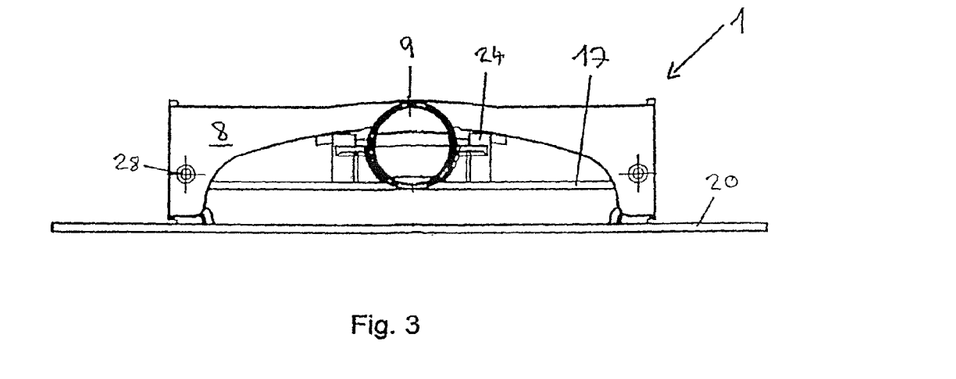
FIG. 3 an end-face view of such an aerator device with gas supply device.

In FIG. 2 the aerator device 1 (without gas supply device or gas connection) is shown in cross section, namely in the operating position. In this respect the resilient membrane 5 attached to the longitudinal sides 6 of the base plate 2 is bulged out due to the gas introduced into the gap 15 between the base plate 2 and the membrane 5.

Figure 1:
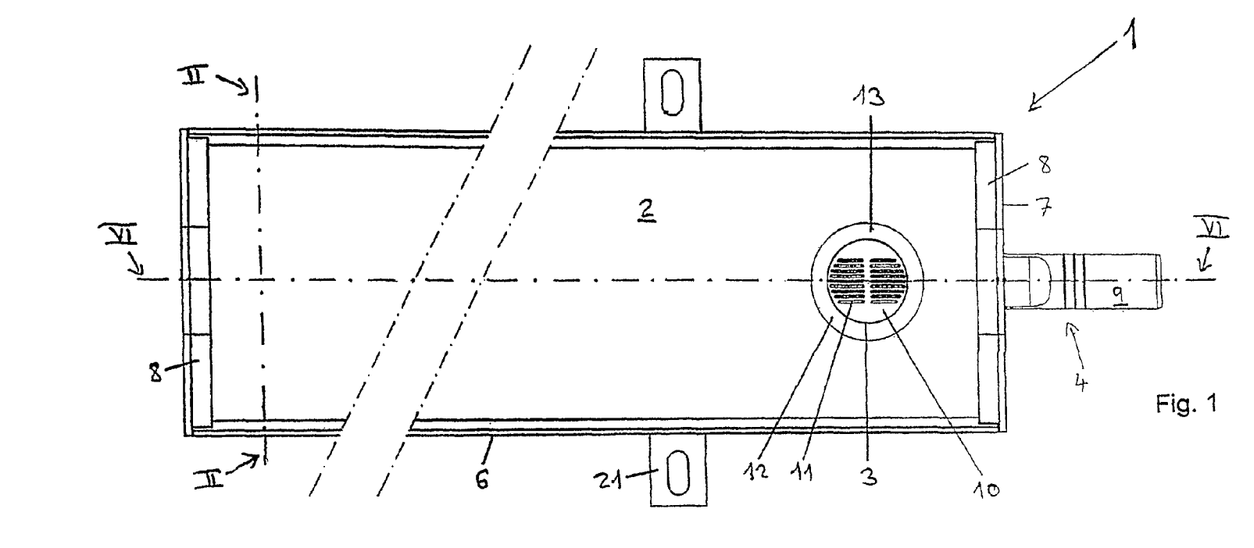
FIG. 1 is a plan view of an aerator device according to the invention, comprising a valve member, with the membrane detached.

The base plate 2 can be formed in a manner known per se by an extruded profiled part; the teen "base plate" is to be understood generally in this instance and in any case is not limited to perfectly flat structures. In the embodiment shown the base plate 2 therefore has a slightly bulged base plate member 16, under which an integral web 17 allows for a cross-bracing for the purpose of stiffening the base plate 2. At the longitudinal sides 6 of the base plate 2 walls (upper side parts 18 and lower side parts 19) are provided, the base plate member 16 adjoining approximately at the mid-height point of the walls or side parts 18, 19. The lower side parts 19 are connected at the bottom side to a mounting plate 20 with a bracket 21 as shown in FIG. 1 for attaching the aerator device 1 to the base of a clarifying tank (see also FIG. 3).

In the edge region of the base plate member 16, that is to say in the transition to the side parts 18, 19, longitudinal grooves 22 are configured for clamping the resilient membrane 5, the membrane 5 being clamped by a locking member 23 that fits into the longitudinal grooves 22. The upper side parts 18 are laterally deflectable to facilitate the insertion and detachment of the membrane 5 into and from the longitudinal grooves 22. In addition to this detachable clamped attachment, the membrane 5 can also be fixed in the longitudinal grooves 22 by means of an adhesive. In this instance it is conceivable to apply to the locking member 23 a-toric-adhesive, which is advantageously expandable and therefore additionally clamps the locking member 23 clamping the membrane 5 and presses it into the longitudinal groove 22. This may be desirable, particularly when a relatively high gas pressure is applied in operation, in order to counteract a possible extraction of the edge regions of the membrane 5.

Figure 6:
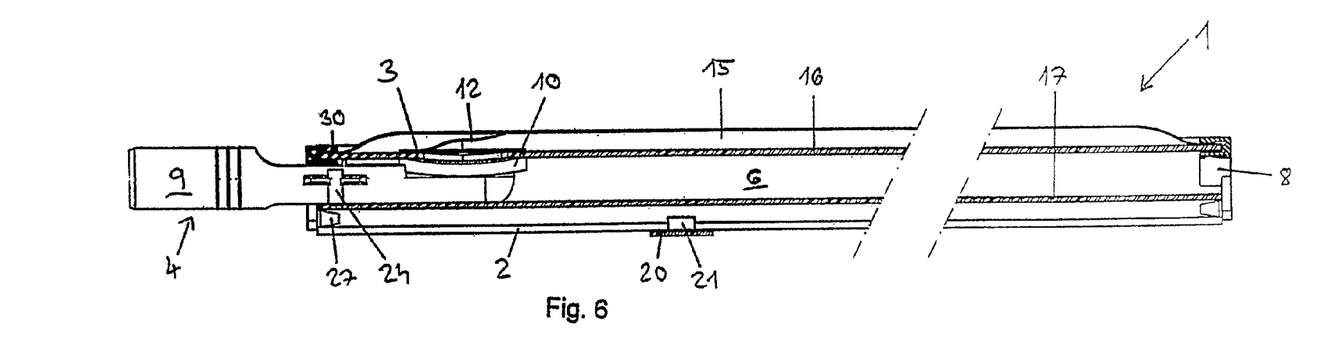
FIG. 6 is a longitudinal sectional view of the aerator device along line VI-VI in FIG. 1.
Figure 7:
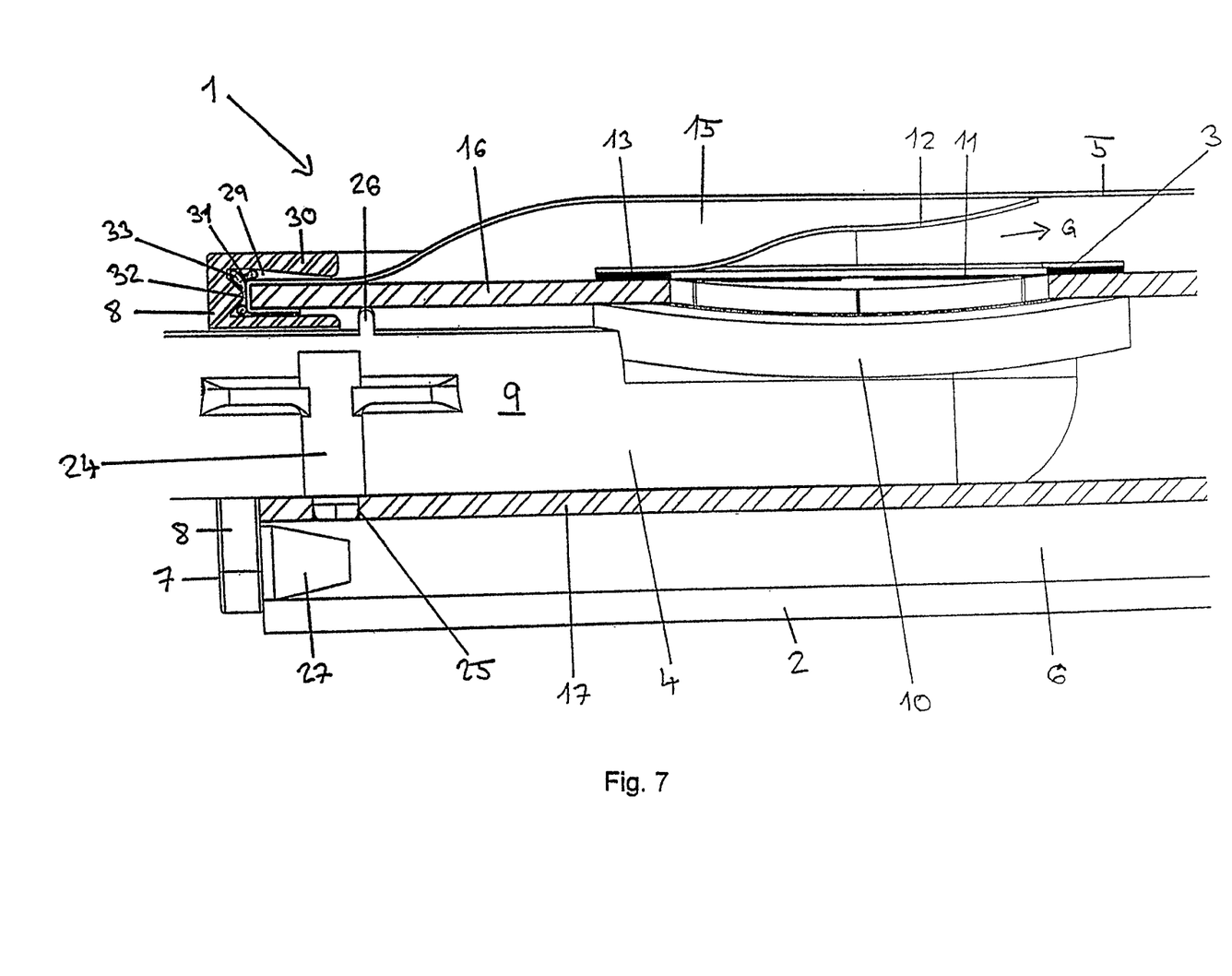
FIG. 7 is an enlarged longitudinal sectional view of this aerator device in the operating position, illustrating the function of the valve member.

As shown in FIGS. 3, 4, 6, and 7, as well as 13, the gas supply device 4, in particular the tubular gas supply channel 9, is also detachably assembled, in addition to the snug fit of the gas supply device 4 in the gas supply vent 3 of the base plate 2, to the web 17 configured for the purpose of stiffening the base plate 2 and therefore retained at the base plate 2 (see FIGS. 6 and 7). In detail, the tubular gas supply channel 9 is flattened on the base plate side and comprises laterally protruding, integrally mounted feet 24, which are received in insertion holes 25 (FIG. 7) in the web 17 of the base plate 2. So that this plug-in connection cannot easily detach itself, furthermore, a transverse web 26 which rests against the underside of the base plate member 16, is provided at the upper face of the gas supply channel (see FIGS. 7 and 13).

Figure 10:
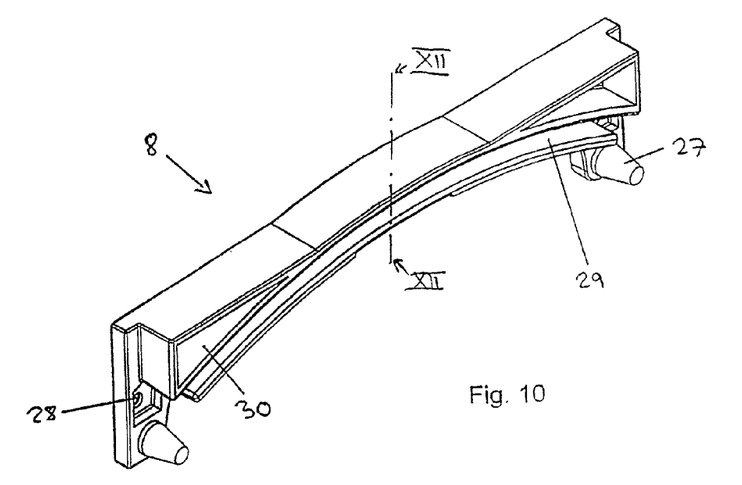
FIG. 10 is a perspective view of an end part of the aerator device according to the invention.
Figure 11:
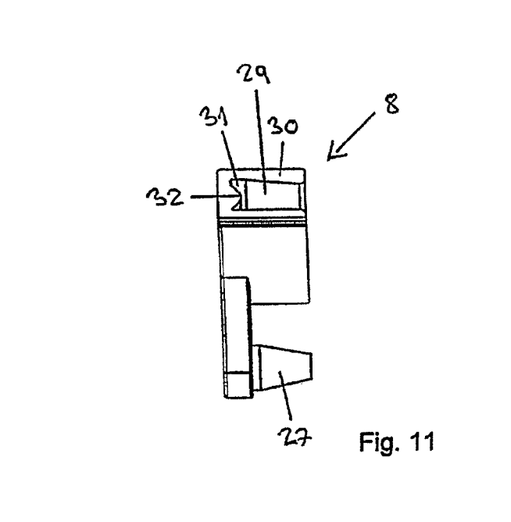
FIG. 11 is a schematic side or sectional view of the end part according to FIG. 10.
Figure 12:
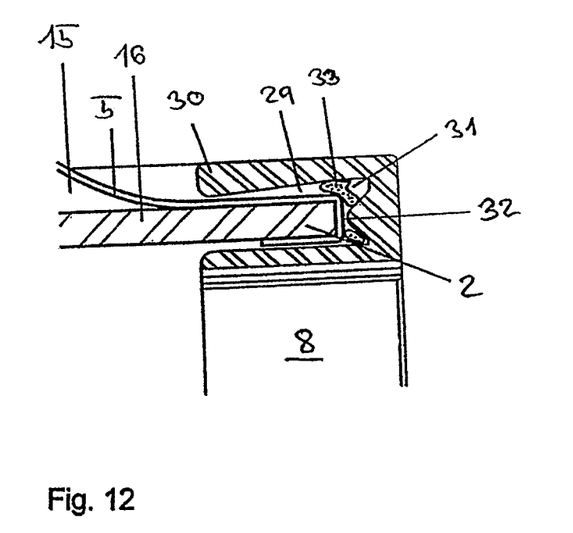
FIG. 12 is a detailed sectional view of this end part with an incorporated base plate and membrane along line XII-XII in FIG. 10.

As can also be seen from FIGS. 6, 10 and 11, for the detachable connection with the base plate 2, the end parts 8 are provided with tenons 27, which are inserted at the end faces 7 of the base plate 2, for example at the lower side parts 19 of the base plate 2. If desired, an adhesive can be used here for a particularly firm hold. Furthermore, the end parts 8 comprise holes 28 which are arranged in the plugged position of the end parts 8 to the base plate 2 in the direction of the longitudinal grooves 22 in the base plate 2. These holes 28 can serve as an 'adhesive overflow' for an adhesive used in the longitudinal grooves 22, as well as providing an additional adhesive connection between the end part 8 and the base plate 2.

The end parts 8 of the base plate 2 are substantially arc-shaped (cf. FIG. 10.), corresponding with the cross-section form of the base plate 2. The end parts 8 fulfil several functions. They close the base plate 2, they clamp the membrane 5 to the end face 7 of the base plate 2, and hence also cover the end faces 7 of the base plate 2. The clamping function is shown in detail in the cross-sectional view in FIG. 12 (see also FIG. 7). The membrane 5 is turned over the (end) edge of the base plate 2 and is clamped in a clamping groove 29 in the end part 8 of the base plate 2. The clamping groove region of the end part 8, seen in cross-section, has an upper bracket 30 narrowing the clamping groove 29 towards the opening (see FIG. 12) and abutting or pressing rigidly on the upper face of the membrane 5, thereby strengthening the fixing of the membrane 5.

Furthermore, the membrane 5 can be additionally fixed in the clamping groove 29 with the help of an adhesive. For this purpose adhesive 33 can be applied in the space 31 provided in the clamping groove 29, which is further formed by a rib 32, before the end part 8 is attached to the base plate 2. Polyurethane adhesives have proven to effectively provide a particularly rigid grip, since they allow a strengthened clamping effect to be achieved due to their expanding properties.

Double-sided adhesive tape 34 can be applied at the upper end-face edge of the base plate member 16 (see FIG. 4) for simple assembly of the membrane 5. An additional tightness of the base plate-membrane gap 15 is also achieved by this fixture.

When equipping a clarifying tank with the device 1 according to the present invention for introducing gas bubbles into the waste water of the clarifying tank, several devices 1 can be strung together, as well as arranged next to each other.

The base plate 2 can also be designed so as to be stacked one above the other, with the lower side parts 19 possibly featuring corresponding base-side or foot-side recesses, in which the upper side parts 18 of an underlying base plate 2 can be received (see FIG. 2).

The invention claimed is:

1. An aeration device with a gas supply device for introducing gas bubbles into a liquid, a base plate and a membrane detachably retained on one side thereof, the base plate having formed therein a gas supply vent the gas supply vent comprising a valve member made of resilient material, the gas supply vent being connected to the gas supply device wherein
the gas supply device has at least one tubular gas supply channel, and further has a base plate connecting part with a grid structure for gas-outlet on the upper side thereof, which base plate connecting part is retained in the gas supply vent; and wherein
the valve member has at least one slot, the valve member being directly attached to an outer surface of the base plate at the circumference of the gas supply vent,
whereby the gas supply vent can be closed when the gas supply is interrupted.

2. The aeration device according to claim 1, wherein the grid structure of the base plate connecting part is detachably retained by snug fitting in the gas supply vent.

3. The aeration device according to claim 2, wherein the gas supply vent, the valve member and the base plate connecting part are, in top view, substantially circular.

4. The aeration device according to claim 3, wherein the valve member is attached within an attachment region provided at the edge of the gas supply vent by an adhesive.

5. The aeration device according to claim 4, wherein at least one slot is designed to have a shape which in top view is arch-shaped, linear, Y-shaped, cross-shaped or star-shaped.

6. The aeration device according to claim 5, wherein the slot is arch-shaped and the curvature of the arch-shaped slot corresponds to the curvature of the circular shape of the gas supply vent.

7. The aeration device according to claim 2, wherein a tubular gas supply channel terminates in the base plate connecting part which is disc-shaped and has a step-like edge to fit snugly in the gas supply vent.

8. The aeration device according to claim 1, wherein the base plate having two longitudinal sides and two end faces, is in top view of rectangular shape, wherein the membrane is retained detachably along the longitudinal side of the base plate and wherein the gas supply vent having the valve member is arranged close to one of the end faces of the base plate in the region of the longitudinal centre of the base plate.

9. The aeration device according to claim 5, wherein the slot of the valve member is annular-shaped and has a concave side which faces one of the end faces opposite the gas supply vent of the base plate.

10. The aeration device according to claim 1, wherein the gas supply device is insertable from one of the end faces of the base plate to the longitudinal centr of the base plate.

11. The aeration device according to claim 1, wherein end-face end parts are detachably mounted on the end faces of the base plate, and are connected to the base plate via at least one plug-in connection.

12. The aeration device according to claim 1, wherein the base plate comprises longitudinal grooves at the edges for clamping a perforated membrane in which, a locking member that fits in the respective longitudinal groove is provided.

13. The aeration device according to claim 12, wherein the resilient material of the valve member corresponds to the material of the membrane.

14. The aeration device according to claim 11, wherein
the base plate having two longitudinal sides and two end faces is, in top view, of rectangular shape; and
the end parts comprise clamping grooves for retaining the membrane at the base plate.

15. The aeration device according to claim 14, wherein the clamping grooves comprise a rib.

16. The aeration device according to claim12, wherein the perforated membrane is additionally adhered to the longitudinal sides and/or to the end face of the base plate wherein a polyurethane adhesive is introduced, in the longitudinal grooves of the base plate or, in the clamping grooves of the end parts.

17. The aeration device vice according to claim 1, wherein the base plate is cambered, and is configured integrally with a stiffening web as an extruded part.

* * * * *